United States Patent
Roop

(10) Patent No.: US 9,821,906 B1
(45) Date of Patent: Nov. 21, 2017

(54) ELONGATED NOSE STRUCTURE TO PROVIDE STABILITY DURING BOARDING

(71) Applicant: Kitty Hawk Corporation, Mountain View, CA (US)

(72) Inventor: Joseph Roop, Sunnyvale, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/428,038

(22) Filed: Feb. 8, 2017

(51) Int. Cl.
*B64C 27/20* (2006.01)
*B64C 35/00* (2006.01)
*B64C 25/54* (2006.01)
*B64C 27/08* (2006.01)
*B64C 27/50* (2006.01)
*B64F 1/12* (2006.01)

(52) U.S. Cl.
CPC .............. *B64C 27/20* (2013.01); *B64C 25/54* (2013.01); *B64C 27/08* (2013.01); *B64C 27/50* (2013.01); *B64C 35/001* (2013.01); *B64F 1/125* (2013.01)

(58) Field of Classification Search
CPC ....... B64C 11/02; B64C 11/14; B64C 25/001; B64C 25/54; B64C 27/08; B64C 27/20; B64C 27/50; B64C 35/001; B64C 35/003
See application file for complete search history.

(56) References Cited

U.S. PATENT DOCUMENTS

| 2,702,171 A | * | 2/1955 | Katzenberger | .......... B64C 25/54 244/101 |
| 3,039,537 A | * | 6/1962 | Heidelberg | ............. B64C 27/20 244/207 |

* cited by examiner

*Primary Examiner* — Nicholas McFall
(74) *Attorney, Agent, or Firm* — Van Pelt, Yi & James LLP

(57) ABSTRACT

A rotor with an elongated nosecone structure to provide stability when boarding or deplaning and to prevent damage to rotor blades is disclosed. A rotor as disclosed herein may include a plurality of rotor blades affixed to the hub structure; and an elongated nose structure extending away from the hub in a direction substantially orthogonal to a deployed direction of said rotor blades, the elongated nose structure having a length greater than a diameter of the elongated nose structure.

10 Claims, 5 Drawing Sheets

US 9,821,906 B1

ELONGATED NOSE STRUCTURE TO PROVIDE STABILITY DURING BOARDING

BACKGROUND OF THE INVENTION

Multicopter aircraft typically include a plurality of lift rotors disposed at outer extremities of the aircraft, such as at the end of booms or other structures that extend radially from a center region of the aircraft.

Multicopter aircraft may have rotors that are mounted on the underside of a boom or other structure, and which provide lift to the aircraft from the underside of the structures on which the rotors are mounted.

Some multicopter aircraft may be designed to take off and land on water and/or to fly over water, and may have pontoons or other flotation type landing gear. Typically, landing gear may be mounted near a central part of the aircraft, from which the structures on which the rotors are mounted may extend outwards.

For a manned multicopter, a pilot or other passenger typically is seated near the center of the aircraft. To get into or out of the aircraft, the pilot or other passenger may need to step up onto a part of the aircraft that extends away from the center, such as a boom or other structure on which a rotor may be mounted. The weight of the person may tend to tip the aircraft, since the pontoon or other landing gear may not provide a wide base and/or may not be located under a structure on which the person must step to board or deplane, potentially resulting in damage to a rotor. For a waterborne aircraft, the person may not have the option to walk on the ground between structures to get access to and mount the center portion, and even for non-waterborne aircraft such access may not be safe or possible.

BRIEF DESCRIPTION OF THE DRAWINGS

Various embodiments of the invention are disclosed in the following detailed description and the accompanying drawings.

DETAILED DESCRIPTION

Figure 1A:
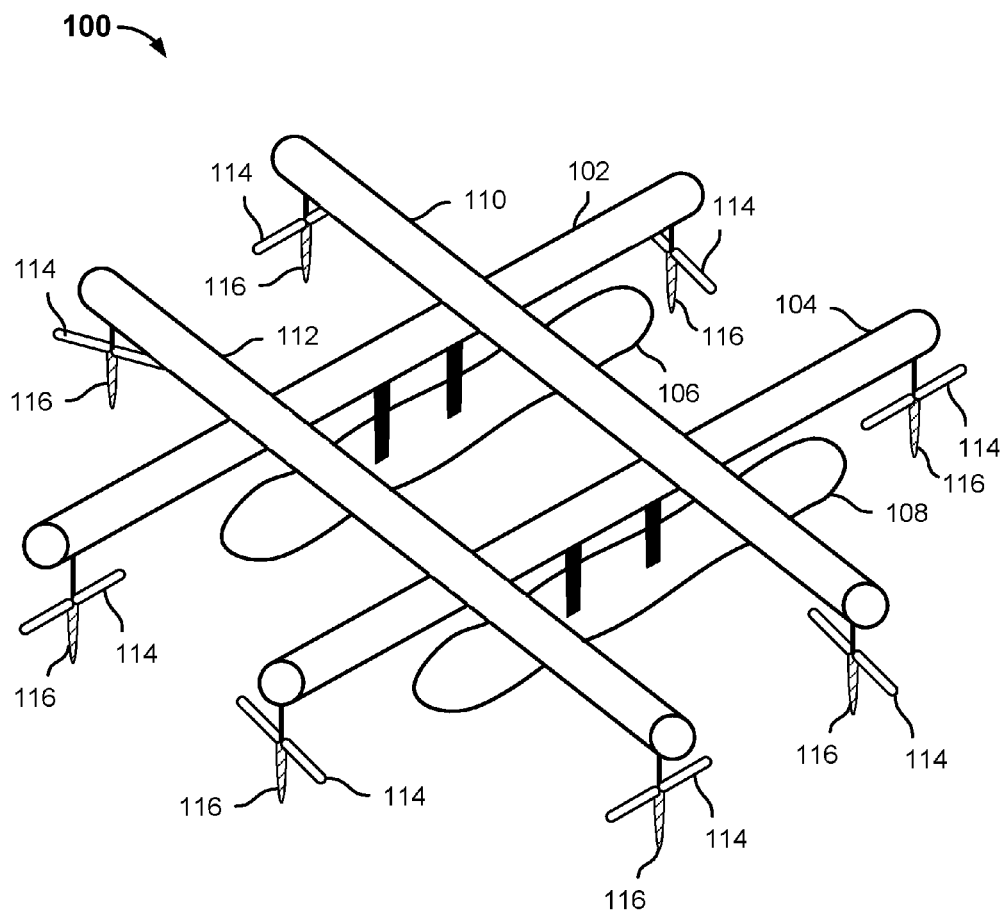
FIG. 1A is a diagram illustrating an embodiment of a multicopter having rotors with elongated nose structures.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A multicopter comprising rotors with elongated nose structures is disclosed. In various embodiments, a multicopter includes a plurality of rotors each disposed at an underside position at a distal end of a boom or other structure extending from or otherwise disposed on or around a center portion of the multicopter aircraft. In various embodiments, the elongated nose extends downward from a hub at the center of the rotor and is of a length determined based at least in part on an above ground (or water) clearance from the hub to the ground or other surface when the multicopter aircraft is landed on the ground (or water). The elongated nose structure in various embodiments has an aerodynamic shape, to minimize drag during flight. The elongated nose structure may be made of composite, lightweight metal, or other lightweight material that is sufficiently strong to support the weight of a person standing on an upper side of the structure on which the rotor is mounted.

In various embodiments, the length of the elongated nose structure is such that a distal end or tip of the nose structure engages the ground (or other surface) to prevent the multicopter aircraft from tipping or tipping too far, thereby preventing damage to the rotor blades. In some embodiments, the length is determined based at least in part on an expected vertical clearance of an associated rotor hub or blade above the ground or another surface. In some embodiments, the length of the elongated nose structure is greater than the diameter of the elongated nose structure. In some embodiments, the length of the elongated nose structure may be on the order or the length of the rotor blades. In some embodiments, the length of the elongated nose structure may be determined based at least in part on the length of the rotor blades and a maximum expected and/or tolerable tilt angle of the aircraft, such that if tilted at the maximum tilt angle while on the ground and/or water and/or alongside a floating pier or other embarkation/disembarkation structure a distal end of the elongated nose structure contacts the ground (or other surface) before any blade of an associated rotor does.

FIG. 1A is a diagram illustrating an embodiment of a multicopter having rotors with elongated nose structures. In the example shown, multicopter 100 includes a pair of fore-aft booms 102, 104, mounted on pontoons 106, 108 (e.g., for water landing), and a pair of athwartship booms 110, 112, that cross and are affixed rigidly to the fore-aft booms 102, 104, forming a lattice. Multicopter 100 includes at each distal end of booms 102, 104, 110, and 112 a lift rotor 114 mounted on an underside of the boom.

Each rotor 114 includes an elongated nose structure 116 that extends from a central hub of the rotor 114. In various embodiments, the elongate nose structure 116 has a length determined based at least in part on a clearance associated with the associated rotor 114, e.g., a design, expected, and/or actual vertical distance of a hub portion of the rotor 114 above the ground, or in the case of a waterborne multicopter such as multicopter 100 of FIG. 1A another surface, a vertical distance of the hub portion of rotor 114 above the water or a floating or other dock or pier used to board or egress from the multicopter 100 when it is floating on its pontoons 106, 108 adjacent to the dock or pier.

While in the example shown in FIG. 1A all rotors 114 have an elongated nose structure 116, in some embodiments only a subset of rotors 114 have elongated nose structures 116, e.g., only those on one or both sides (ends of booms 110, 112), to facilitate boarding/deplaning.

Figure 1B:
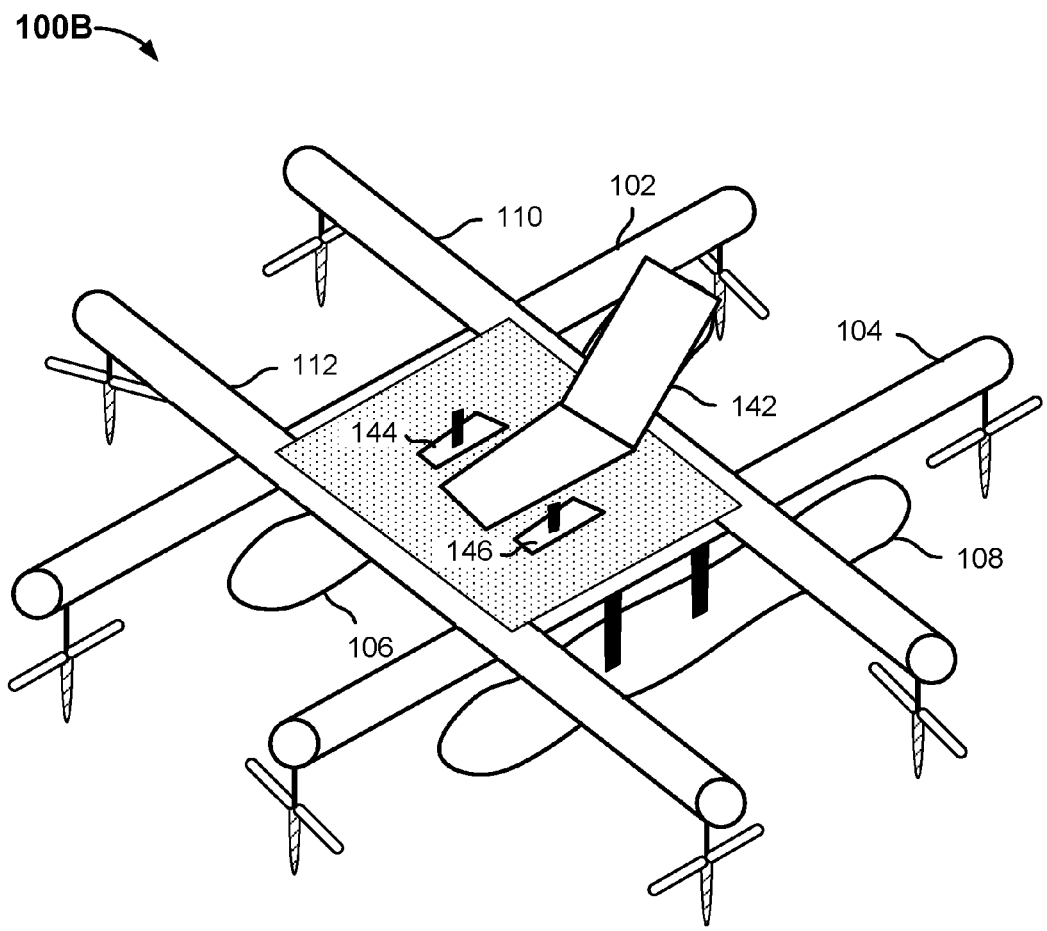
FIG. 1B is a diagram illustrating an embodiment of a multicopter having rotors with elongated nose structures.

FIG. 1B is a diagram illustrating an embodiment of a multicopter having rotors with elongated nose structures. In the example shown, multicopter 100B includes the same boom, pontoon, and rotor structures as in FIG. 1A. In addition, multicopter 100B includes in a center region defined by the lattice formed by booms 102, 104, 110, and 112, a seat 142 and hand-operated controls 144 and 146. As can be seen from the example shown in FIG. 1B, to board multicopter 100B and be seated in seat 142, a person standing initially on a floating dock or other dock or pier to which the multicopter 100B may be moored may need to step onto a portion of one of the booms 110, 112 at a position outboard a center of gravity of the multicopter, causing the aircraft to tend to tilt downward at the end at which the person is boarding. In various embodiments, the elongated nose structures 116 are of a length such that a distal tip or end of the nose structure engages the dock or pier and prevents the aircraft from tipping too far, such as to a point at which a rotor blade of one or more of the rotors 114 may be damaged by contact with the dock or pier.

Figure 2A:
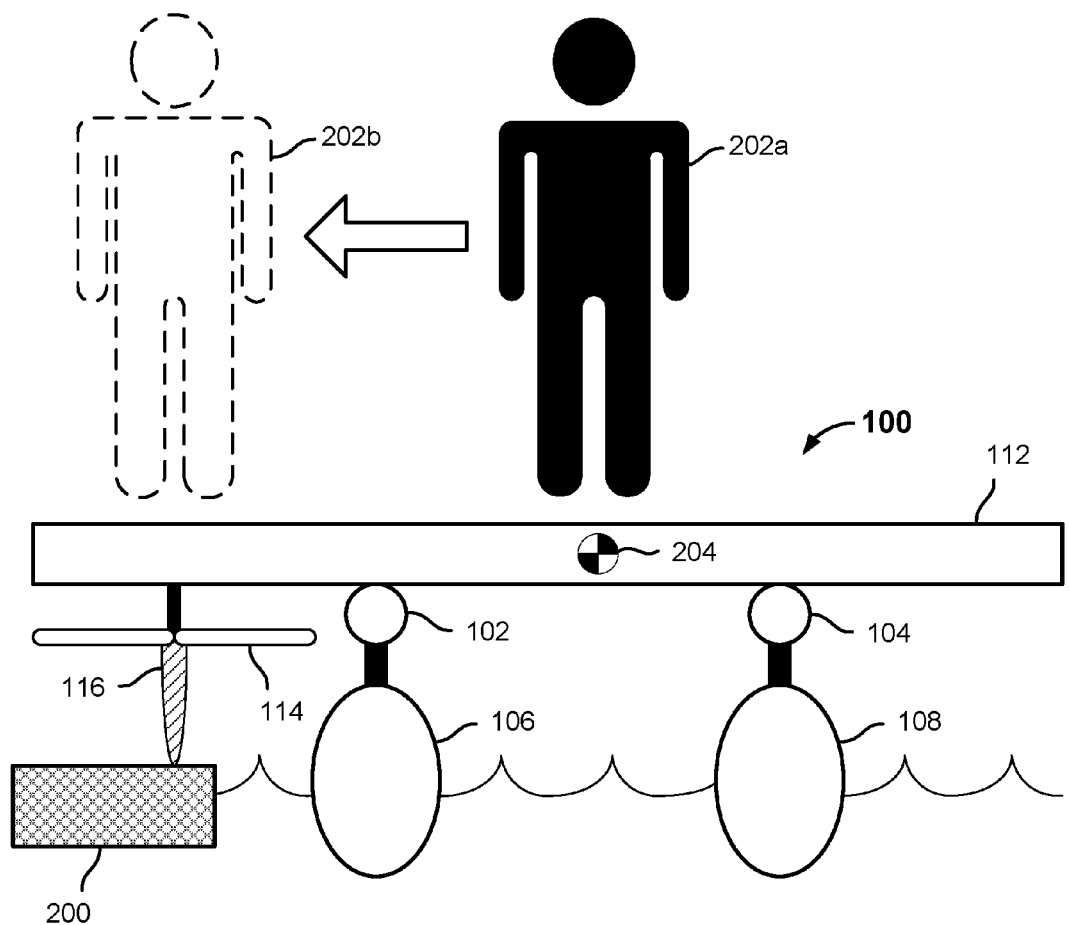
FIG. 2A is a diagram illustrating an embodiment of a multicopter having rotors with elongated nose structures.

FIG. 2A is a diagram illustrating an embodiment of a multicopter having rotors with elongated nose structures. In the example shown, multicopter 100 of FIG. 1A is shown in a front view while floating in water during non-flight. The multicopter 100 is shown alongside a floating pier 200, such as may be used to board or deplane the aircraft. FIG. 2A shows a pilot or other passenger 202 moving from a first position 202a to a second position 202b. The first position 202a is located approximately above a center of gravity 204 located between the longitudinal booms 102, 104 and associated pontoons 106, 108. In the first position 202a, the weight of the passenger 202 would be approximately aligned with the center of gravity 204 of the aircraft, generating no moment about the center of gravity 204, and the buoyancy forces transmitted via pontoons 106 and 108 would be of roughly equal magnitude and would generate offsetting moments, resulting in a stable state. However, in various embodiments, absent the elongated nose structure 116, if the passenger 202 moved to position 202b the multicopter 100 would tend to tip towards the pier 200, potentially resulting in damage to the blades of rotor 114. Typically, aircraft such as multicopter 100 air made of lightweight materials. As a result, a human such as passenger 202 may be of sufficient weight relative to the multicopter 100 itself to cause the multicopter 100 to tip far and quickly enough to damage the rotor 114 before the passenger 202 could react to avoid such damage, such as by returning to position 202a or hopping off onto pier 200.

As shown in FIG. 2A, in various embodiments elongated nose structure 116 has a length associated with an expected clearance distance from rotor 114 to pier 200 and/or other structures and locations onto which a passenger such as passenger 202 may be expected to deplane. For example, in the example shown, the length of elongated nose structure 116 may be selected at design time at least in part by determining based on the weight of the aircraft and expected payloads, such as passenger 202, how far the rotor 114 is expected to be above the surface of the water and/or a pier floating thereon, such as pier 200.

Figure 2B:
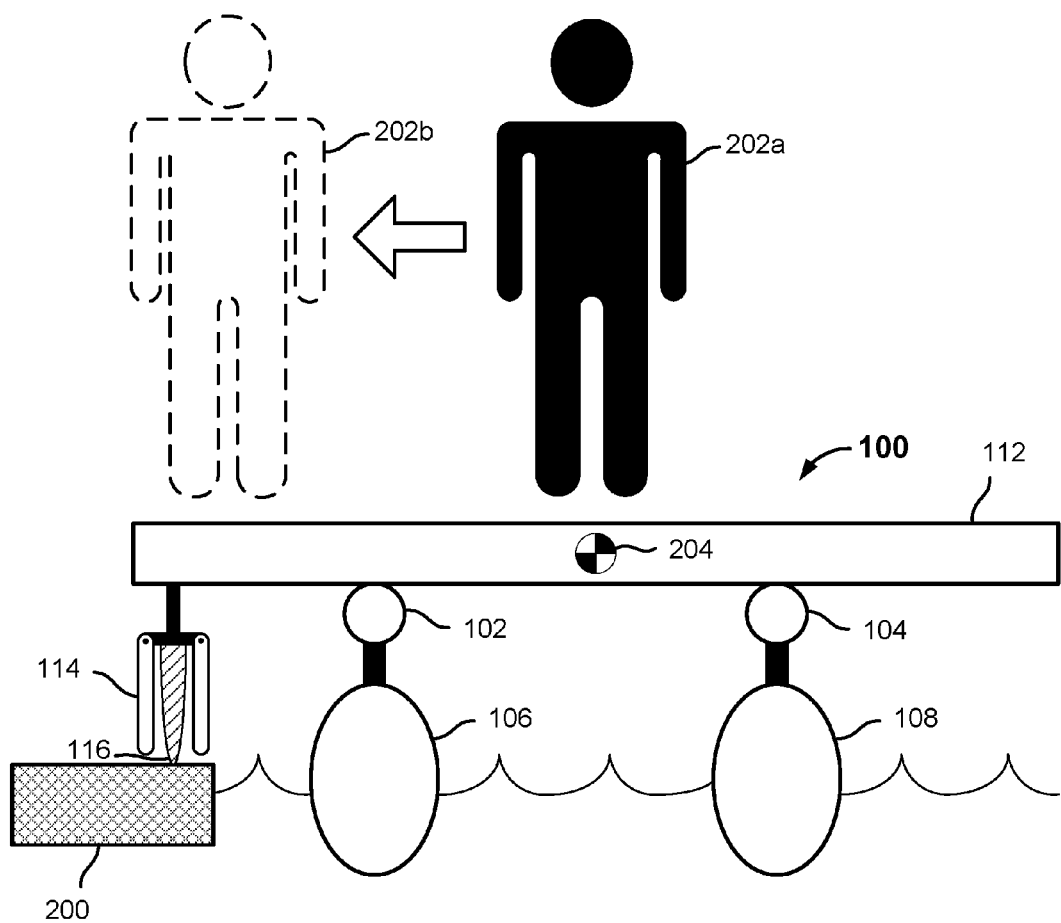
FIG. 2B is a diagram illustrating an embodiment of a multicopter having rotors with elongated nose structures.

FIG. 2B is a diagram illustrating an embodiment of a multicopter having rotors with elongated nose structures. In the example shown, rotor 114 is shown to have blades that fold down alongside the elongated nose structure 116 when the rotor 114 is not rotating. In addition to preventing the aircraft from tipping, in this embodiment the elongated nose structure 116 also prevents the folding blades of rotor 114 from contacting the pier 200 (or other surface), in a way that a non-elongated nose structure would not. Note the fact that the blades of rotor 114 can fold down and be protected by elongated nose structure 116 enables the boom 112 to be made shorter, reducing the overall width of the aircraft, which may make it easier to transport and/or store the aircraft.

Figure 3:
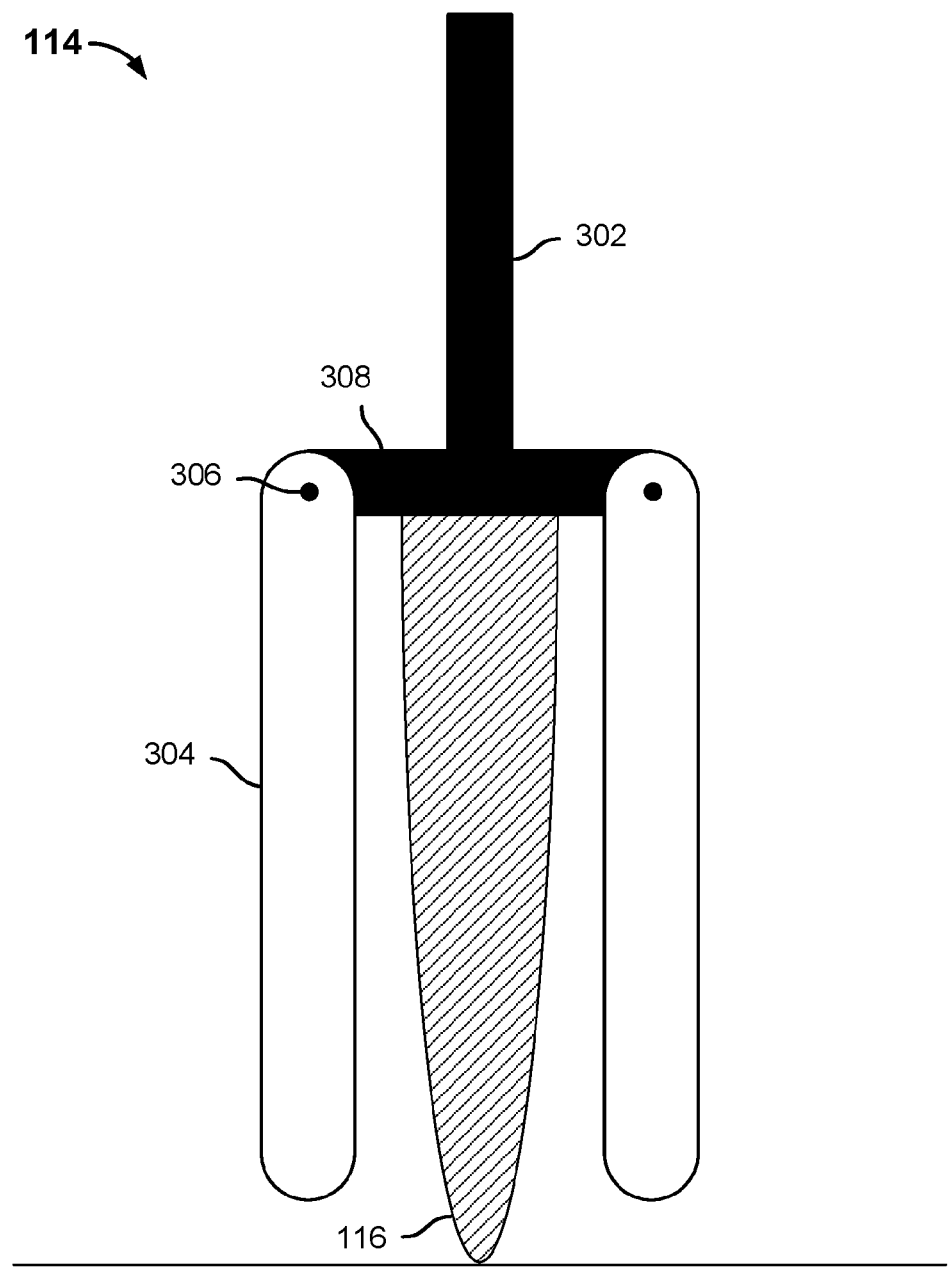
FIG. 3 is a diagram illustrating an embodiment of a rotor with folding blades and an elongated nose structure.

FIG. 3 is a diagram illustrating an embodiment of a rotor with folding blades and an elongated nose structure. Rotor 114 of FIG. 2B is shown in FIG. 3 to include a shaft 302 connected to an electric or other drive motor (not shown) and folding blades 304 coupled via a pin or other structure 306 to a hub 308 that is coupled fixedly to shaft 302. In operation (e.g., flight) the shaft 302 rotates at a relatively high RPM causing blades 304 to be deployed outward, by centrifugal force, and to generate lift as a result of their aerodynamic design (not shown in FIG. 3, in which blades 304 are shown for clarity and conveniences as having a simple, non-aerodynamic shape).

Techniques disclosed herein may be used in various embodiments to provide a multicopter or other aircraft, watercraft, or other vehicle that a passenger can board or deplane safely and without causing damage to blades or other structures that extend below a superstructure of the vehicle.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A rotor, comprising:
    a plurality of rotor blades affixed to a hub structure; and
    an elongated nose structure extending away from the hub in a direction substantially orthogonal to a deployed direction of said rotor blades, the elongated nose structure having a length greater than a diameter of the elongated nose structure;
    wherein the rotor blades are affixed to the hub in a manner such that the rotor blades extend radially outward from the hub when a motive force is applied to a shaft on which the rotor is mounted; and
    wherein the rotor blades are affixed to the hub via a pin, hinge, or other structure that allows the rotor blades to fold into a stowed position alongside the elongated nose structure when said motive force is not being applied to the shaft.

2. The rotor of claim 1, wherein the length of said elongated nose structure is sufficient to engage by contact a surface opposite the rotor when a force is applied to a structure on which the rotor is mounted.

3. The rotor of claim 1, wherein the length of said elongated nose structure is determined based at least in part on a blade length of said rotor blades.

4. The rotor of claim 1, wherein the length of said elongated nose structure is determined based at least in part on a design expected tilt angle of an aircraft or other vehicle comprising the rotor.

5. The rotor of claim 4, wherein the rotor is mounted on an underside of the aircraft or other vehicle.

6. A multicopter aircraft, comprising:
   a body structure extending outward from a central cockpit section of the aircraft;
   a rotor mounted to an underside of said body structure at a distal end of said body structure, said rotor comprising:
      a plurality of rotor blades affixed to a hub structure;
      an elongated nose structure extending away from the hub in a direction substantially orthogonal to a deployed direction of said rotor blades, the elongated nose structure having a length greater than a diameter of the elongated nose structure;
   wherein the rotor blades are affixed to the hub in a manner such that the rotor blades extend radially outward from the hub when a motive force is applied to a shaft on which the rotor is mounted; and
   wherein the rotor blades are affixed to the hub via a pin, hinge, or other structure that allows the rotor blades to fold into a stowed position alongside the elongated nose structure when said motive force is not being applied to the shaft.

7. The multicopter aircraft of claim 6, wherein the body structure comprises a boom.

8. The multicopter aircraft of claim 6, further comprising a pair of pontoons affixed to an underside of the aircraft, said pontoons being of a size and shape sufficient to enable the aircraft to land in the water and be supported by a combined buoyancy force generated by the pontoons.

9. The multicopter aircraft of claim 8, wherein the length of said elongated nose structure is determined at least in part based on a vertical clearance between said rotor and a floating pier to which said aircraft is designed to be moored when on the water.

10. The multicopter aircraft of claim 9, wherein the length of said elongated nose structure is determined at least in part based on an expected angle of tilt of aircraft alongside the floating pier.

* * * * *